UNITED STATES PATENT OFFICE.

NATHAN I. NATHAN, OF NEW YORK, N. Y.

PROCESS OF MAKING ARTIFICIAL BUTTER.

SPECIFICATION forming part of Letters Patent No. 263,199, dated August 22, 1882.

Application filed July 14, 1882. (No specimens.)

*To all whom it may concern:*

Be it known that I, NATHAN I. NATHAN, of the city, county, and State of New York, have invented a new and useful Improvement in the Process of Making Artificial Butter, of which the following is a specification.

My invention relates to the manufacture of artificial or oleomargarine butter; and it consists in first purifying what is commercially known as "leaf-lard," usually put up in kegs, firkins, and casks, which purification is accomplished by first washing the leaf-lard, then cutting and mincing the same in a suitable machine, and then placing the cut and minced lard in a vessel capable of being heated, so as to melt or fuse the lard, which is then strained by being forced through a fine sieve, whereby it is substantially freed of all fiber. The lard which has passed through the sieve is then subjected to the action of cold water to which has been previously added and thoroughly stirred a quantity of borax and nitric acid, about in the proportions hereinafter specified. By treating the lard in this solution, composed of water, borax, and nitric acid, the effect is to further cleanse the lard and make it partake of or assume a clear white color free of all odor and almost perfectly tasteless. After being subjected to this treatment the mass is removed and thoroughly rewashed in cold water, preferably in a separate and distinct vessel from that previously employed, whereby the product becomes a purified or deodorized leaf-lard, its characteristics being that it is of a beautiful color—a clear white—perfectly odorless, remarkably solid, and free from the disagreeable taste usually present with lard. Arriving at this stage of the process, a certain minute quantity of nitric acid is added to the water and incorporated with a certain quantity of the purified or deodorized lard to further strengthen the solution, and this mode of treatment and addition of nitric acid are continued as mass after mass of the purified or deodorized lard is prepared, the operation being continued until the product assumes a clear white color, void of odor and taste. The product thus obtained is mixed with oleomargarine, which is now a commercial article and readily obtained in the market, and when all is thoroughly mixed the mass is subjected to heat—say to about 95° Fahrenheit. After having been so mixed and heated it is ready for the churn, where milk and sugar are added, and after the churning operation it is conveyed to a refrigerated receptacle, where it is instantly solidified, after which it is salted and subjected to a rolling or mixing action for the purpose of impregnating it with a desired quantity of salt, which renders it ready for the market, capable of being made into rolls, blocks, or any desired shape.

In practicing my invention I purchase in open market fresh leaf-lard, and after having thoroughly washed it cause it to be cut up and minced in a suitable machine. The washed and minced lard is then placed into a vessel and subjected to a heat that will cause the mass to become thoroughly fused. The vessels are then prepared, which may be designated as "Nos. 1, 2, and 3." In Nos. 1 and 2 there is placed about sixty gallons of ice-water, and in the first named (No. 1) there should be mixed about three ounces pulverized borax and three ounces nitric acid. The washed and melted lard is then run through a fine sieve into the vessel designated "No. 3," for the purpose of separating the fiber. Of the lard thus washed there is then taken, say, about one hundred and fifty pounds at a time, which is thoroughly washed in the vessel designated "No. 1," which causes it to solidify, from whence it is taken and placed in vessel designated "No. 2," where it is rewashed and thoroughly cleansed. When each one hundred and fifty pounds has passed through this process there is added, in addition to the cold water, one ounce nitric acid to maintain the strength of the solution, as the first-treated quantity deprives the solution of a portion of its strength, and this addition of nitric acid is continued until all the lard prepared for the purpose has passed through the process. Should the water become milky-white, the ice-water vessels should be emptied and the solution made over again. The result obtained is a beautiful clear, white, odorless, and tasteless product, which I call "deodorized lard."

My process of manufacturing oleomargarine-butter and its various treatments in various stages are about as follows: Oleomargarine-oil—a commercial article—is procured, and about one thousand pounds placed in a tank, to which is added from five to fifty per cent. of the purified or deodorized lard, according to the state of the climate, and all is then subjected to a heat of about 95° Fahrenheit. When sufficiently heated it is run into or conveyed to a suitable churn, where milk or cream, or both, are added, together with dissolved sugar and sufficient coloring-matter familiar to dairymen or those skilled in such arts. After the churning operation, which should last about thirty minutes, it is run off into a box containing ice or ice-water, or other suitable refrigerant, which causes the entire mass to solidify almost instantly, and when reduced to this solid condition it is conveyed to tables prepared for the purpose, whereon it is salted to suit the taste, where it is allowed to remain from twelve to twenty-four hours. It is then passed through rollers for the purpose of uniformly mixing the salt. The article is then ready to be packed in any desirable shape.

The result of the above process is the production of a uniform article in every respect resembling the finest quality of butter, which will not become rancid or crumble or break down in warm or cold weather.

I am aware that crude fat has been treated at a temperature of 140° to 145° Fahrenheit in contact with common salt, saltpeter, borax, and boracic and salicylic acids, withdrawing the separated fat and incorporating therewith a second and smaller charge of the above chemicals, with the addition of boracic acid; and I am also aware that fat has been separated from the stearine and from the oleine by subjecting it successively to the action of solutions of sugar of lead, alum, bicarbonate of potash, and nitrate of soda, and to mechanical pressure; and I am also aware that it is not new to purify and bleach tallow, lard, and other fatty matter by subjecting the same in succession to the action of sulphuric acid, alum, and atmospheric air, whether the air be or be not charged with vapor of salt.

What I claim is—

The within-described process of manufacturing artificial butter by uniting oleomargarine with leaf-lard, the latter having been previously cleaned, fused, strained, and subjected to a washing action in a solution of water, borax, and nitric acid, then rewashed and the united mass heated and subjected to the ordinary churning operation, all substantially in the manner described.

N. I. NATHAN.

Witnesses:
W. R. CARTER,
G. M. PRINCE.